Patented Mar. 7, 1944

2,343,456

UNITED STATES PATENT OFFICE 2,343,456

MONOCALCIUM PHOSPHATE CRYSTALLIZATION

Arthur H. Henninger, Floral Park, N. Y., assignor to General Chemical Company, New York, N. Y., a corporation of New York No Drawing. Application April 24, 1940, Serial No. 331,387

8 Claims. (Cl. 23—109)

This invention relates to a method of crystallizing monocalcium phosphate from monocalcium phosphate solutions or slurries, and particularly to the preparation of monocalcium phosphate crystals of improved structure which can be readily wrung, e. g. centrifuged, to produce a crystalline product retaining a minimum of adherent mother liquor.

In accordance with a known process of producing monocalcium phosphate, phosphoric acid is reacted with a calcium compound to produce a solution of monocalcium phosphate containing free phosphoric acid. The solution is concentrated by evaporation at low temperatures to avoid formation of dicalcium phosphate until the desired monocalcium phosphate crystals are precipitated. The crystals are separated from the mother liquor by filtration or centrifuging. The monocalcium phosphate crystals thus produced, it has been found, are difficult to separate from the mother liquor. These crystals ordinarily carry from 13 to 16% water and between 2.5 to 4.0% phosphoric acid along with other impurities contained in adherent mother liquor which cannot be removed by centrifuging and which remain in the final product. Due to this high water content, the mass of crystals becomes doughy in subsequent mulling operations, and the dough forms small lumps during the drying of the product. These lumps tend to gum the mill in which it is attempted to grind them.

It is an object of this invention to provide a process for crystallizing monocalcium phosphate from solutions or slurries such as those produced by reacting phosphoric acid with lime, to produce a monocalcium phosphate product which is more readily and completely separable from the mother liquor than the monocalcium phosphate products produced by the heretofore known process hereinabove mentioned. Other objects and advantages of this invention will appear from the following description thereof.

I have made the surprising discovery that by evaporating a monocalcium phosphate solution or slurry so as to convert a substantial portion of the monocalcium phosphate to dicalcium phosphate and thereafter cooling the resulting slurry to reconvert the dicalcium phosphate to monocalcium phosphate and to crystallize the monocalcium phosphate, while controlling the concentration of free phosphoric acid so that it is within the limits of from about 9 to about 14%, preferably 10 to 12%, expressed as $P_2O_5$, when the monocalcium phosphate is crystallized from the solution or slurry, crystals of monocalcium phosphate are produced which are more readily and completely separable from the mother liquor than monocalcium phosphate products produced by the aforesaid heretofore known process In the practice of my invention, the monocalcium phosphate solution may be prepared by reacting lime with phosphoric acid, e. g. "wet process" phosphoric acid produced by treating phosphate rock with sulfuric acid. The monocalcium phosphate solution thus produced is treated to remove impurities; for example, the filtrate obtained by filtering the monocalcium phosphate slurry to separate it from the "white mud" and which has been treated with bone black in accordance with the invention disclosed and claimed in Patent No. 2,312,047 patented Feb. 23, 1943, to further reduce the fluorine content thereof, may be gassed with hydrogen sulfide to precipitate lead and arsenic as sulfides which may be separated by filtration. The resultant monocalcium phosphate solution is then evaporated to produce a slurry containing from 30 to 40% solids (monocalcium phosphate crystals), preferably 31 to 33%. During the evaporation, samples of the slurry in the evaporator are removed, analyzed for free phosphoric acid, and, depending upon the results of the analyses, free phosphoric acid added, preferably in the form of mother liquor from a previous batch, so as to maintain the concentration of free phosphoric acid within the limits of from about 9 to about 14%, preferably 10 to 12%, expressed as $P_2O_5$.

Evaporation may be carried out under vacuum in a vacuum evaporator at a temperature of from about 110 to 130° F., preferably at about 125° F. ±5°, or at atmospheric pressure at a temperature within the range of about 220° to 240° F., preferably at about 230° F. If carried out under vacuum, when the slurry has been concentrated to a point where it contains from 30 to 40% solids, preferably 31 to 33%, the vacuum is broken and the slurry then heated at atmospheric pressure to boiling to convert a substantial portion of the monocalcium phosphate to dicalcium phosphate and phosphoric acid. Conversion of monocalcium phosphate to dicalcium phosphate usually occurs at a temperature within the range of 200° to 210° F.; to insure the conversion of a substantial portion of the monocalcium phosphate to dicalcium phosphate the slurry is heated at atmospheric pressure until the boiling point is reached and is boiled for a substantial period of time, say, from 30 to 40 minutes. Conversion of the monocalcium phosphate to dicalcium phosphate is manifested by a change in the appearance of the slurry; viz. a change from a viscous, silky, iridescent mass to a thinner, flat-white mass.

The dicalcium phosphate slurry produced as hereinabove described, or by heating monocalcium phosphate solution or slurry at atmospheric pressure throughout the concentration thereof to contain the desired amount of solids, namely, 30 to 40% and preferably 31 to 33%, and then continuing the heating until substantially all or at least a major portion of the monocalcium phosphate has been converted to dicalcium phosphate, is cooled to a temperature of 70° to 100° F. The rate of cooling, it has been found, does not affect the structure of the crystals. On cooling, the dicalcium phosphate reacts with the phosphoric acid to re-form monocalcium phosphate of improved crystalline structure. As above indicated, it is important in order to obtain crystals of improved wringing characteristics that the concentration of free phosphoric acid in the monocalcium phosphate liquor from which the monocalcium phosphate crystals are produced be within the limits of about 9 to about 14%, preferably from about 10 to about 12%. The slurry containing the monocalcium phosphate product may be passed to a wringer, centrifugal separator, filter or other device for separating the product from the mother liquor.

Operating in accordance with this invention, it has been found that wringer cakes result containing an average of 4 to 8% water and 1 to 2% phosphoric acid expressed as $P_2O_5$. Further, the monocalcium phosphate crystal can be wrung or centrifuged with comparative ease to separate adherent mother liquor resulting in a substantial increase in the capacity of this equipment as well as in products of greater purity, due to the substantial reduction in the amount of adherent mother liquor in the final product. The wringer cakes remain comparatively dry in the muller and upon drying and grinding produce a product which contains substantially no lumps.

As illustrating the marked difference in the wringing qualities of monocalcium phosphate crystals produced in accordance with this invention and such crystals produced in accordance with a previously known process, attention is called to the following data based on analysis of wringer cakes produced in the same equipment operated under like conditions, to determine the amount of adherent mother liquor (expressed as per cent $H_2O$) and amount of free phosphoric acid expressed as $P_2O_5$ found on these cakes:

|  | Analyses of centrifuged crystals | |
| --- | --- | --- |
|  | Per cent $H_2O$ | Per cent free $P_2O_5$ |
| Batch 1: | | |
| Wringer cakes prepared according to invention | 6.12 | 1.22 |
| Wringer cakes prepared according to known method | 13.35 | 2.73 |
| Batch 2: | | |
| Wringer cakes prepared according to invention | 6.71 | 1.97 |
| Wringer cakes prepared according to known method | 14.71 | 3.27 |
| Batch 3: | | |
| Wringer cakes prepared according to invention | 7.30 | 1.48 |
| Wringer cakes prepared according to known method | 15.81 | 3.31 |

It will be noted that in each case less than half as much mother liquor adhered to the wringer cakes of monocalcium phosphate crystals produced in accordance with this invention than adhered to wringer cakes of crystals produced by the heretofore known process. Also, the amount of free phosphoric acid adhering to crystals produced in accordance with this invention is substantially less than that adhering to crystals produced by processes not involving this invention.

Monocalcium phosphate crystals produced in accordance with this invention were found to vary in size from 100 to 400 microns and to have an average size of 200 microns; in the case of one batch produced under like conditions as the product hereinabove referred to except for the crystallization which was carried out in accordance with a known method, the product was found to vary in size from 60 to 100 microns and average 75 to 80 microns.

The following example illustrates one embodiment of the process of this invention: A batch of 110,000 pounds of monocalcium phosphate liquor containing 13.5% monocalcium phosphate and 0.8% free phosphoric acid, expressed as $P_2O_5$ was prepared. 16,000 pounds of this liquor and 19,000 pounds of combined mother and wash liquor from preceding batches containing 9% free phosphoric acid, expressed as $P_2O_5$, were charged into a vacuum evaporator, and evaporation commenced. The temperature in the evaporator was kept at 125° F.±5°, and the initial level of liquor was maintained by feeding monocalcium phosphate liquor from the original batch to the evaporator. After evaporation for about one hour, samples were withdrawn and found to have a free phosphoric acid content of 5.5% expressed as $P_2O_5$. Additional mother liquor in the amount of 6,000 pounds was then added and the evaporation continued for sixteen hours. The remainder of the batch of monocalcium phosphate liquor was added during this period. On completion of evaporation, 42,000 pounds of liquor containing 31% suspended solids and 11% free phosphoric acid, expressed as $P_2O_5$, remained in the evaporator. The vacuum was then interrupted and the slurry brought to a boil at atmospheric pressure and boiled for one-half hour. The temperature of the slurry while it was heated to bring it to its boiling point was noted on an automatic temperature recording device which showed a dip in the temperature curve within the range of 200° to 210° F. This dip indicates conversion of monocalcium phosphate to dicalcium phosphate. Also, upon observation of the slurry during its heating, it was noted that there was a change therein during the heating from a viscous, silky iridescent appearance to a thinner, flat-white appearance, indicating that a major portion of the monocalcium phosphate had been converted to dicalcium phosphate.

The dicalcium phosphate slurry was cooled over a period of six to eight hours to a temperature of 110° F. On cooling the dicalcium phosphate reacted with the phosphoric acid to re-form monocalcium phosphate. The slurry was then passed to a wringer and the mother liquor separated from the crystals. The crystals were washed with monocalcium phosphate liquor containing 13.5% monocalcium phosphate and 0.8% free phosphoric acid, expressed as $P_2O_5$. The combined mother and wash liquor contained 9% free phosphoric acid, expressed as $P_2O_5$. The monocalcium phosphate crystals thus produced were wrung with comparative ease to produce a monocalcium phosphate product which gave no difficulties in mulling and drying and produced a granular product containing little or no lumps.

It will be noted that the process of this invention provides a simple and inexpensive method of forming monocalcium phosphate crystals having a crystal structure such that they may be readily separated from the mother liquor. Due to the improvement in the wringing characteristics of the crystal product produced in accordance with this invention, this invention results in a substantial increase in the capacity of the wringers, centrifugals or other equipment used to effect separation of the crystals, e. g. wringer cake from the mother liquor. Further, a product of higher purity is obtained in that contamination of the product by impurities necessarily contained in the mother liquor is substantially reduced due to the reduction of the amount of mother liquor adhering to the crystals.

Since certain changes may be made in carrying out the above process without departing from the scope of the invention, it is intended that all matter contained in the above description shall be interpreted as illustrative and not in a limiting sense.

What is claimed is:

1. The method of forming monocalcium phosphate crystals from a monocalcium phosphate liquor containing free phosphoric acid which comprises heating the liquor so that a major portion of the monocalcium phosphate is converted to dicalcium phosphate and thereafter cooling the liquor so that the dicalcium phosphate is converted to monocalcium phosphate and the monocalcium phosphate is crystallized in a form readily separable from the mother liquor, the concentration of free phosphoric acid in said liquor being within the limits of about 9 to 14%, expressed as $P_2O_5$, during said crystallization of the monocalcium phosphate.

2. The method of forming monocalcium phosphate crystals which comprises heating a solution comprising monocalcium phosphate and free phosphoric acid so that the solution is concentrated and at least a major portion of the monocalcium phosphate is converted to dicalcium phosphate crystals, and thereafter cooling the solution so that the dicalcium phosphate is reconverted to monocalcium phosphate and a slurry containing monocalcium phosphate crystals is produced, the concentration of free phosphoric acid in said slurry being within the limits of about 9 to about 14%, expressed as $P_2O_5$, and crystallizing monocalcium phosphate in a form readily separable from the mother liquor from said slurry.

3. The method of forming monocalcium phosphate crystals from a solution containing monocalcium phosphate and free phosphoric acid which comprises evaporating the solution so that a slurry of monocalcium phosphate crystals containing about 9 to about 14% free phosphoric acid, expressed as $P_2O_5$, is formed, heating the slurry to a temperature above about 200° F. so that substantially all of the monocalcium phosphate is converted to dicalcium phosphate, and thereafter cooling the slurry so that the dicalcium phosphate is reconverted to monocalcium phosphate and the monocalcium phosphate is crystallized in a form readily separable from the mother liquor.

4. The method of forming monocalcium phosphate crystals from a solution containing monocalcium phosphate and free phosphoric acid which comprises evaporating and heating the solution so that a slurry is formed and a major portion of the monocalcium phosphate is converted to dicalcium phosphate and thereafter cooling the slurry containing the dicalcium phosphate so that the dicalcium phosphate is reconverted to monocalcium phosphate and the monocalcium phosphate is crystallized in a form readily separable from the mother liquor, the free phosphoric acid content of the solution from which the monocalcium phosphate is crystallized being between about 9 and 14%, expressed as $P_2O_5$.

5. The method of forming monocalcium phosphate crystals from a solution containing monocalcium phosphate and also containing free phosphoric acid in amount such that on precipitation of monocalcium phosphate crystals the acidity will be between about 9 and about 14% phosphoric acid, expressed as $P_2O_5$, which comprises evaporating the solution so that monocalcium phosphate crystals are precipitated, heating the resultant slurry to a temperature above about 200° F. so that a major portion of the monocalcium phosphate is converted to dicalcium phosphate, and thereafter cooling the dicalcium phosphate containing slurry so that the dicalcium phosphate is converted to monocalcium phosphate and the monocalcium phosphate is crystallized in a form readily separable from the mother liquor.

6. The method of forming monocalcium phosphate crystals from a solution containing monocalcium phosphate and free phosphoric acid which comprises evaporating the solution under vacuum at a temperature between 110 to 130° F. so that a slurry of monocalcium phosphate crystals is formed, adjusting the free acid content of the liquid between 10 and 12% free phosphoric acid, expressed as $P_2O_5$, boiling the slurry for a substantial period of time under atmospheric pressure so that a major portion of the monocalcium phosphate is converted to dicalcium phosphate, and thereafter cooling the slurry so that the dicalcium phosphate is converted to monocalcium phosphate and the monocalcium phosphate is crystallized in a form readily separable from the mother liquor.

7. The method of forming monocalcium phosphate crystals from a solution containing monocalcium phosphate and free phosphoric acid which comprises evaporating the solution under the conditions of temperature and acidity required to form monocalcium phosphate crystals, adjusting the acidity to between about 9 and about 14%, expressed as $P_2O_5$, heating the solution to a temperature above about 200° F. so that at least a major portion of the monocalcium phosphate is converted to dicalcium phosphate crystals and phosphoric acid and cooling the solution so that the dicalcium phosphate crystals are converted to monocalcium phosphate and the monocalcium phosphate is crystallized in a form readily separable from the mother liquor.

8. The method of forming monocalcium phosphate crystals which comprises reacting lime with phosphoric acid so that a monocalcium phosphate solution is formed, adding mother liquor from previous batches containing free phosphoric acid, evaporating the solution under vacuum so that a slurry containing from 30 to 40% monocalcium phosphate and free phosphoric acid of from 10 to 12%, expressed as $P_2O_5$, is formed, then heating the slurry to above about 200° F. so that a major portion of the monocalcium phosphate is converted to dicalcium phosphate and cooling the slurry so that monocalcium phosphate is reformed and crystallized in a form readily separable from the mother liquor.

ARTHUR H. HENNINGER.